United States Patent Office 2,979,537
Patented Apr. 11, 1961

2,979,537

SELECTIVE BROMINATION OF BENZENE

Arthur A. Asadorian, Midland, Mich., assignor to The Dow Chemical Company, Midland, Mich., a corporation of Delaware No Drawing. Filed Feb. 4, 1959, Ser. No. 791,024

5 Claims. (Cl. 260—650)

The present invention relates to a new and useful method of selectively brominating benzene and is more particularly concerned with a new and useful method for preparing 1,2,4,5-tetrabromobenzene.

Heretofore, the bromination of benzene to a product containing less than six bromine atoms has been carried out chiefly by the use of less than the theoretical bromine to prepare the desired product and then a lengthy and difficult separation of the various products one from the other. The higher the degree of bromination, i.e., the nearer the number of bromine atoms substituted on the benzene nucleus approaches six, the more difficult becomes the control to derive the desired product and the more difficult becomes the separation of the desired product from the other undesired compounds.

It is an object of the present invention to provide a new and useful process for the preparation of 1,2,4,5-tetrabromobenzene substantially free from by-products. It is a further object of the present invention to provide a new and useful process for the production of 1,2,4,5-tetrabromobenzene which process requires little or no purification of the product and which product is easily separated from the by-products by simple conventional techniques. These and other objects will become apparent to those skilled in the art as the following description and claims proceeds.

It has now been found that 1,2,4,5-tetrabromobenzene can be prepared in substantially quantitative yields by the bromination of benzene in the liquid phase in the presence of an iron catalyst and an inert organic solvent selected from the group consisting of carbon tetrachloride and chloroform. The reaction proceeds smoothly at from about 0° C. to about 40° C. and preferably at from 15° to 25° C. Good results are obtained when the reactants are employed in equivalent amounts to obtain the desired product, although an excess of the bromine reactant is not detrimental to the production of the desired product. The catalyst may be any of the well known bromination catalysts although anhydrous ferric chloride has proven to be advantageous since it is easily removed from the reaction mass at the end of the process and is one of the cheapest of the catalysts which could be employed.

In carrying out the process of the present invention, liquid bromine is reacted with benzene in the presence of an inert organic solvent, i.e., chloroform or carbon tetrachloride, and ferric chloride. The order of addition of the reactants is not critical and either reactant may be added to the other. The reaction is carried out at from 0° to 40° C. and when complete, as evidenced by the cessation of the evolution of HBr gas, the reaction mixture is heated to the reflux temperature to insure completion of the reaction and drive off the residual HBr. Upon cooling to about room temperature, solids which have formed are removed from the mother liquor and may suitably be washed with hydrobromic acid to leach out the iron catalyst, then with dilute sulfite solution to insure removal of all the excess bromine and, finally dried to obtain a cream colored solid 1,2,4,5-tetrabromobenzene product.

The following examples illustrate the present invention but are not to be construed as limiting.

EXAMPLE 1

Duplicate brominations were carried out at room temperature with 0.05 mole of benzene (3.9 grams) feeding slowly into 0.6 mole (96 grams) of bromine (i.e., an amount of bromine calculated for 100 percent excess for hexabromobenzene) having one gram of iron powder catalyst dissolved therein. In one of the experiments the excess bromine itself served as solvent while in the other 100 cc. of chloroform (alcohol free) was used as solvent. After three days at room temperature, all of the excess bromine and solvent were removed by heating the reactor and contents on a steam bath. The solids were then leached with dilute hydrobromic acid to extract the iron catalyst. Hot water washing, drying and grinding gave:

|  | Bromine Solvent | Chloroform Solvent |
| --- | --- | --- |
| Product | $C_6Br_6$ | 1,2,4,5-$C_6H_2Br_4$. |
| Color Solids | Gray Powder | Gray brown powder. |
| Weight Solids | 21.7 g | 18.9 g. |
| Yield | 78.7% as $C_6Br_6$ | 96.0% as $C_6H_2Br_4$. |
| Assay | 98.8% $C_6Br_6$ | 99.9% as $C_6H_2Br_4$. |

EXAMPLE 2

*Preparation of 1,2,4,5-tetrabromobenzene*

One mole of benzene (78 grams) dissolved in 500 cc. of carbon tetrachloride containing two grams of anhydrous $FeCl_3$ was treated slowly with an excess of bromine. However, the presence of free bromine persisted despite the addition of only 96 percent of the theoretical bromine (925 grams) for hexabromobenzene. When reaction had definitely subsided, the red mixture was slowly heated in a water bath until bromine refluxed freely and HBr evolution had stopped. An additional one gram of anhydrous $FeCl_3$ catalyst caused no apparent HBr generation with bromine refluxing, so reaction must be considered complete. The mixture was allowed to cool to room temperature, and the cold red liquor was drained off for potential reuse. The solids were washed with hot dilute hydrobromic acid to leach away all of the iron catalyst, finally with hot dilute $Na_2SO_3$ solution to completely neutralize all traces of free bromine. Drying gave 267 grams of cream colored solids identified as 1,2,4,5-tetrabromobenzene for a 68 percent yield. The solids remaining in the mother liquor, recovered, by evaporation to dryness on the steam bath and hot water washing and drying amounted to 83 g. of tan solids, also identified as 1,2,4,5-tetrabromobenzene, representing a 21 percent additional yield for a total of 89 percent.

As is obvious, the process of the invention may be used to prepare 1,2,4,5-tetrabromobenzene from a partially brominated intermediate such as bromobenzene, 1,2-, 1,3- or 1,4-dibromobenzene or 1,2,4-tribromobenzene.

I claim:

1. A process for the preparation of 1,2,4,5-tetrabromobenzene which comprises reacting benzene with bromide in the liquid phase in the presence of a ferric bromination catalyst and in the presence of an inert organic solvent consisting essentially of one selected from the group consisting of carbon tetrachloride and chloroform.

2. A process for the preparation of 1,2,4,5-tetrabromobenzene which comprises reacting benzene with bromine in the liquid phase in the presence of a ferric chloride catalyst and in the presence of an inert organic solvent consisting essentially of one selected from the group consisting of carbon tetrachloride and chloroform.

3. The process of claim 1 wherein the reaction is carried out at a temperature between about 0° and 40° C.

4. A process as defined in claim 1 wherein the solvent is carbon tetrachloride.

5. A process as defined in claim 1 wherein the solvent is chloroform.

References Cited in the file of this patent

UNITED STATES PATENTS 2,452,154 Ross _____ Oct. 26, 1948

OTHER REFERENCES

Migrdichian: Organic Synthesis, volume 2, pages 1559–1560 and 1564 relied on.